Figures 1, 2:
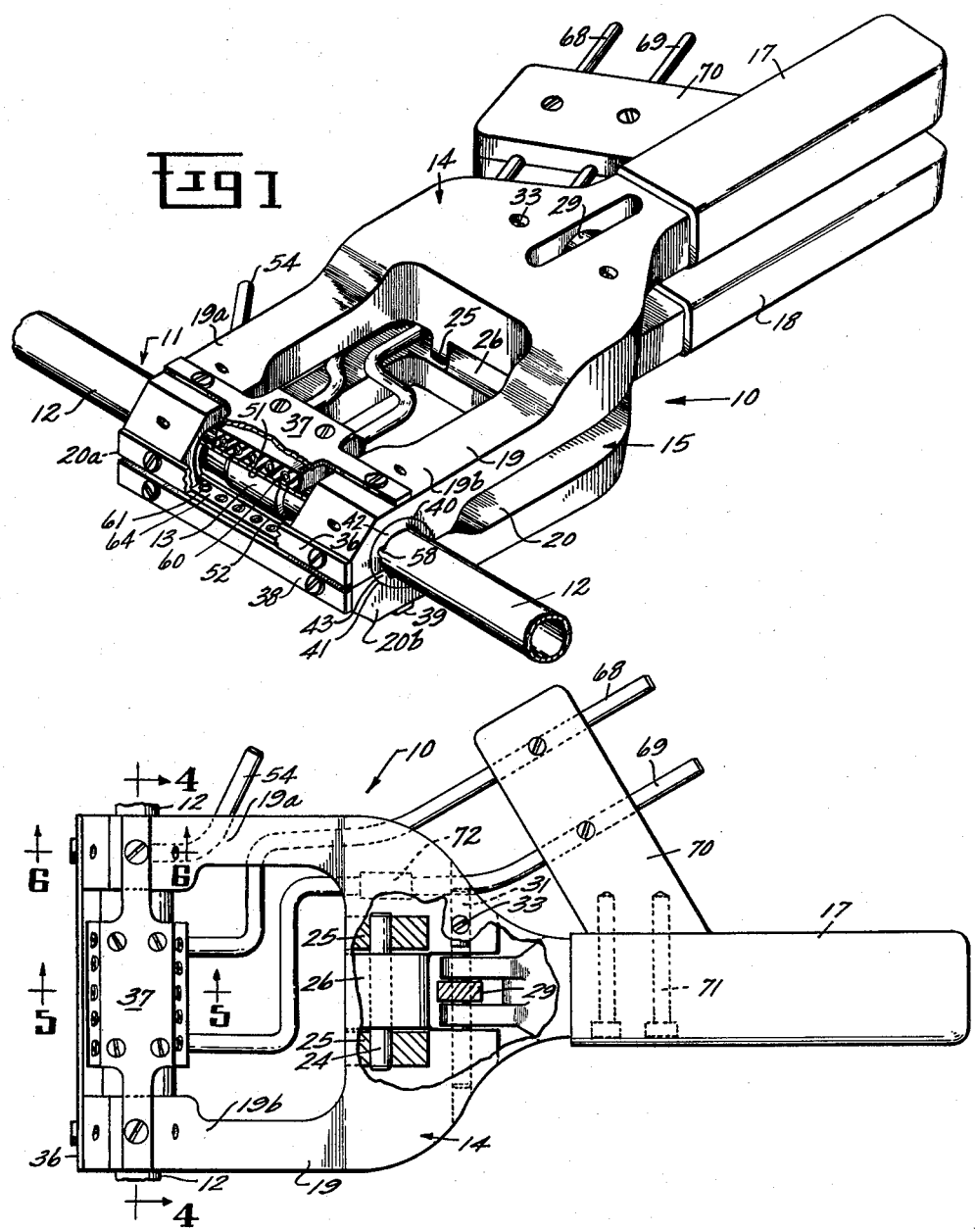

Nov. 12, 1963

P. L. WORTHINGTON 3,110,793

BRAZING TOOL

Filed Nov. 20, 1961

2 Sheets-Sheet 1

INVENTOR.
PETER L. WORTHINGTON
BY
Gerald L. Moore

ATTORNEY-

Nov. 12, 1963
P. L. WORTHINGTON
3,110,793
BRAZING TOOL
Filed Nov. 20, 1961
2 Sheets-Sheet 2
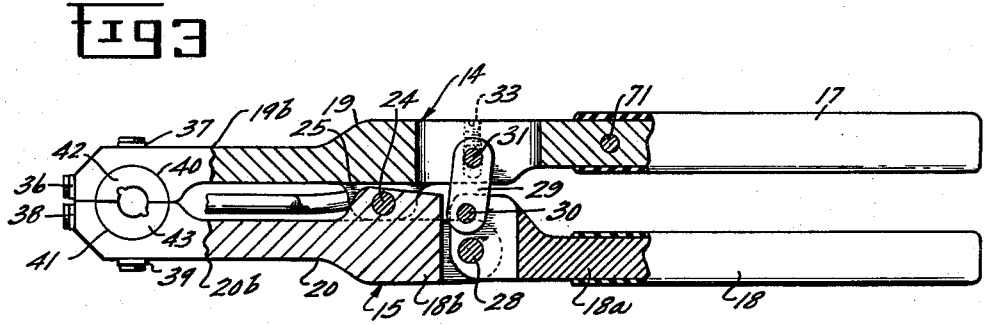
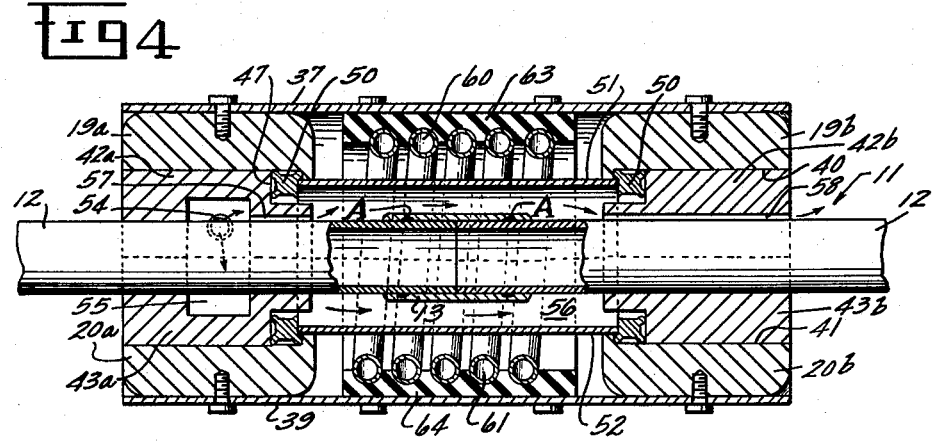
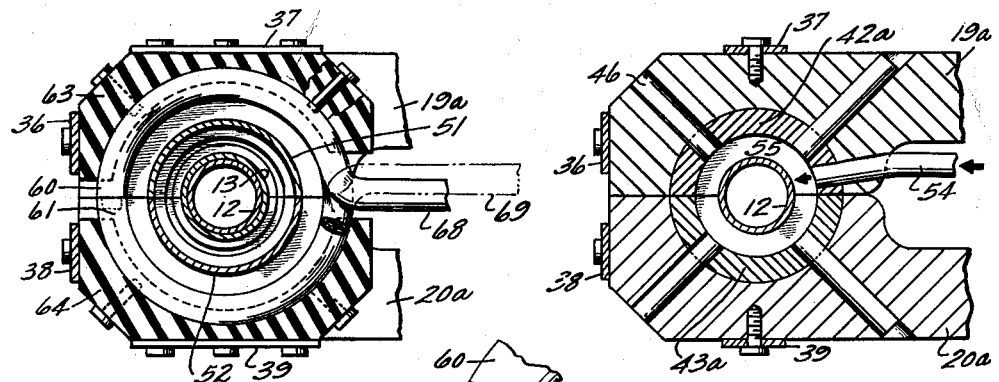
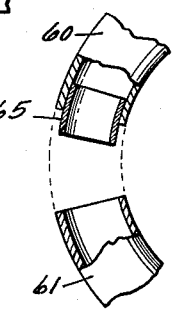
INVENTOR.
PETER L. WORTHINGTON
BY
Gerald L Moore
ATTORNEY

United States Patent Office 3,110,793
Patented Nov. 12, 1963

3,110,793
BRAZING TOOL
Peter L. Worthington, Cincinnati, Ohio, assignor to General Electric Company, a corporation of New York
Filed Nov. 20, 1961, Ser. No. 153,420
1 Claim. (Cl. 219—9.5)

This invention relates to a brazing or soldering apparatus and more particularly to a combination brazing tool which may be used to clamp the workpiece, provide means for surrounding the joint with a non-oxidizing atmosphere and thereafter heat the workpiece to the desired temperature to complete the joining operation.

Frequently in joining operations such as brazing, it is necessary to perform the operation in confined places where easy access to the pieces being joined is not available. However, in all such joining operations, it is necessary to hold the pieces being joined in alignment during the operation, heat the pieces to a sufficient temperature to cause flowing of the filler metal, and preferably to surround the heated joint with a non-oxidizing atmosphere during heating to prevent oxidation and to provide a more reliable joint. However, in the past, the tools which were capable of accomplishing these steps have been large and cumbersome or have frequently required the breaking or destruction of one or more parts of the tool after each operation thereby rendering the operation more expensive and time-consuming.

It should be pointed out however, that where a joining operation is referred to as brazing herein, it is to be understood that this is meant to include the joining of any articles, principally metallic articles, by the fusion of a joining material having a melting point lower than the articles being joined. Examples of such third fusible materials are plastics, brazing alloys, glass, etc.

It is therefore one object of this invention to provide a compact and efficient tool for brazing or the like.

It is a further object of this invention to provide a tool which both clamps and heats the workpiece and which may be recycled indefinitely, It is a further object of this invention to provide a simplified brazing and clamping tool which provides for surrounding the joint with a non-oxidizing atmosphere during heating to provide a more efficient joining operation.

Briefly stated, in accordance with one aspect of my invention, there is provided a compact brazing tool incorporating a holding means for clamping the workpieces in position for the joining operation with handle means for clamping the tool on the workpiece. In addition, the holding means forms an enclosure around the workpiece joint with provisions for introducing a non-oxidizing atmosphere to surround the joint during the joining operation. The heating means is also incorporated in the tool for heating the workpieces during the joining operation to the desired temperature with provisions also made for cooling the heating means if necessary.

The invention will be better understood from the following description taken in connection with the accompanying drawings and its scope will be pointed out in the appended claim.

In the drawings:

FIG. 1 is a perspective view, partially cut away, showing the tool positioned on a workpiece, FIG. 2 is a top plan view, partially cut away of the tool, FIG. 3 is a side plan view, partially cut away, of the tool, FIG. 4 is an enlarged cross-sectional view along the lines 4—4 of FIG. 2, FIG. 5 is an enlarged cross-sectional view along the lines 5—5 of FIG. 2, FIG. 6 is an enlarged cross-sectional view along the lines 6—6 of FIG. 2 and, FIG. 7 is an enlarged view, partially cut away, of the conductor and joining means between the segments of the heating means.

In FIGS. 1–3 the brazing tool 10 is illustrated clamped in position for accomplishing a brazing operation on a tubular workpiece 11, which in this instance is two pipe sections 12 to be joined to a coupling sleeve 13 by heating the workpieces until the brazing alloy inserts A (FIG. 4) flow by capillary action between the coupling sleeve and the workpiece section to join the two pieces.

The tool itself consists of two major components 14 and 15 hinged together having handles 17 and 18 which may be insulated in a suitable known fashion with clamping ends 19 and 20 attached to the handle sections. The clamping ends are divided to form arms 19a and 19b on clamping end 19 and arms 20a and 20b on clamping end 20. The major sections of the tool are joined by a pin 24 passing through projections 25 on tool section 14 and projection 26 on tool section 15. By coupling the sections in this manner the clamping ends 19 and 20 may be pivoted toward and away from each other. To effect this movement of the clamping ends a handle 18 is formed of pivot portions 18a and 18b joined by a pin 28 with a link 29 extending between handle portion 18a and handle 17 in a manner such that by pivoting handle portion 18a about the pin 28, the handle portion 18b and handle 17 are forced together or apart with pins 30, 31, and 28 forming an overcenter action assembly for locking the handles when they are caused to move together. The distance between the handle portions may be adjusted by a screw 33 in handle 17 which adjusts the point of connection between pin 31, and therefore link 29, and the handle 17. It may be seen that by pivoting handle portion 18a about the pin 28 the clamping ends 19 and 20 are caused to pivot about the pin 24 and the clamping ends may be positioned over a workpiece and then brought together by actuation of the handles.

Referring now to the clamping end of the tool, the parallel extensions of the clamping ends 19a and 19b are joined together by an end plate 36 and a side plate 37 while the parallel extending ends of clamping ends 20a and 20b are joined together by an end plate 38 and a side plate 39. Also, the clamping arms 19 and 20 have opposed recesses 40 and 41 into which inserts 42 and 43 may be inserted, with insert 42 being made up of cylindrical halves 42a and 42b and insert 43 including cylindrical halves 43a and 43b. In the recess 40 in the clamping arm 19a, insert 42a may be inserted and maintained in position by pins 46 as illustrated in FIG. 6. Similarly, inserts 42b may be inserted within the clamping arm 19b, 43a in the clamping arm 20a and 43b in clamping arm 20b. By adding these inserts which have a center facing opening therethrough such that when mated with the opposing insert as the clamping ends are brought together match the outside periphery of the workpiece, the workpiece is snugly positioned and held within the clamping ends. Naturally, if a workpiece were of a different configuration, inserts having openings corresponding to the outside configuration of such workpieces may be added for the handling of these other types of workpieces.

The inserts 42 and 43 include an indented portion which forms with the clamping ends 19 and 20 a recess 47 into which is fitted the split annular seals 50. These seals may be of a resilient or semi-resilient material and include means on the inner side thereof for seating a sleeve section 51 extending between the inserts 42a and 42b, this sleeve section comprising 180° section of a cylinder with sleeve section 52 extending between inserts 43a and 43b making up the other half of the cylinder. It may be seen that when the clamping ends are brought together, and the inserts 42a and 43a cooperate with the inserts 42b and 43b to form two clamps fitting around the periphery of the workpiece and the 180° sleeve sections 51 and 52 come together to form a complete cylindrical sleeve fitting between the inserts and around the workpiece joint. The sleeve sections 51 and 52 may be of any heat resistant non-metallic material in the embodiment illustrated, or any material not heated by the induction heating method illustrated in this embodiment. Where other types of heating may be utilized, other materials may be used.

For surrounding the joint to be brazed with a non-oxidizing atmosphere, a conduit 54 is provided leading through the clamping end 19a and into the insert 42a where it terminates in a cavity 55 extending around the workpiece within the inserts 42a and 43a as illustrated in FIG. 6. Extending from this cavity 55 to a second cavity 56 formed by the insert inner walls and the sleeve sections 51 and 52 are small passageways 57 illustrated as being in insert 42a, however similar passageways may be provided in insert 43a. Similar passageways 58 are also located in insert 42b to allow cavity 56 to be open to the atmosphere. It may be seen that by connecting a supply of non-oxidizing gas such as argon to the conduit 54 the gas will pass through the conduit into cavity 55 through passageways 57 and initially purge the chamber 56 of air by forcing it through the passageway 58 to atmosphere. Thereafter by supplying a small amount of gas through the conduit 54 the chamber 56 will be filled with a non-oxidizing atmosphere during the brazing operation. As is well known to the art, the use of a non-oxidizing atmosphere to surround material being heated to high temperatures prevents oxidation of the material which would normally be accelerated by the high temperatures and thereby limits the forming of oxides which severely weaken such joints. By allowing for the flow of the non-oxidizing atmosphere for a short time prior to beginning the actual joining process, it can be assured that the chamber 56 will be purged of all air. However, by properly sealing the chamber 56, a partial vacuum could also be drawn therein to accomplish the same purpose of providing a non-oxidizing atmosphere surrounding the workpiece.

To heat the workpiece coil halves 60 and 61 are provided with coil half 60 supported from an insulating block 63 connected to the side plate 37 and coil half 61 supported from an insulating block 64 supported from the side plate 39. The coil halves each consist of a 180° segment of a coil as illustrated more readily in FIGS. 5 and 7 which when the clamping ends are brought together form a complete coil which surrounds the workpiece chamber 56. The coil halves are joined together by the means illustrated in FIG. 7 wherein coil half 60 includes a pin insert 65 which when the coil halves are brought together interfits with coil half 61 to complete the electrical circuit.

It should also be noted that the heating coils are hollow with this joining means also providing for an internal passage in the coil through which may be passed air or any other cooling fluid for cooling the coils to prevent their overheating during the brazing operation. Ordinary "shop" air may be utilized for this purpose which usually consists of pressurized air of about 40 p.s.i. pressure.

To energize the coils, the coil ends are connected to conductors 68 and 69 extending between the clamping ends of the tool and leading to support means 70 fastened to the handle 17 by screw fasteners 71 and supporting the conductors for attachment to a power source. It should also be noted that these conductors are hollow for the transmission of cooling air and conductor 69 includes a flexible connection 72 which allows for relative movement between the coil half 61 and the handle 17. This movement is required when clamping and unclamping the brazing tool in place over the workpiece.

The power source suitable for supplying sufficient current for induction heating the workpiece may be of any type with at least a 10 kw. rating. It is also possible to heat the workpieces by other heating means such as by a radiant heating supply. This would be especially advantageous and even necessary to use where the workpieces are composed of a non-conductive material, such as plastic. If radiant heating is desired, the induction heating coil or a special coil could be utilized as a resistance heating coil to heat the workpieces.

In operation, the workpiece sections 12 and the coupling 13 including the brazing material insert A, are assembled as illustrated and the brazing tool having inserts 42 and 43 fitting this workpiece, is fitted over the workpiece. Thereafter, connections are made for supplying cooling fluid and a non-oxidizing gas to the brazing tool. The gas flow is started and allowed to continue for a short time, say four minutes to allow the chamber 56 to be purged of all air and to contain only the non-oxidizing gas. Thereafter, the cool air flow may be started which passes through the hollow heating conductor and the power source is energized to cause current to pass through the heating conductors. The workpiece is thereafter heated by an induction heating process as explained heretofore and the temperature of the workpiece is raised to a temperature for a sufficient duration wherein the brazing alloy flows by capillary action between the coupling and the workpieces. Thereafter the heating coil is de-energized and the workpiece is allowed to cool with the brazing tool remaining in position to prevent movement between the workpiece and the coupling during cooling to assure a close fit therebetween. After a short period when the workpiece has sufficiently cooled to solidify the brazing alloy, the brazing tool may be removed by pulling the handles 16 and 18 apart to cause the clamping ends to move apart and the two may be removed from the workpiece to complete the brazing operation. It is seen that a compact, simple and continuously recycling type tool is provided to perform such a joining operation.

Where a particular embodiment of the invention has been illustrated and described, it will be obvious to those skilled in the art that various changes and modifications may be made without departing from the invention. It is therefore intended to cover in the appended claim all such changes and modifications that come within the true spirit and scope of the invention.

What I claim as new and desired as secured by Letters Patent of the United States is:

In a brazing apparatus, the combination of a scissors-type clamp for holding the workpieces,
  said clamp including a pair of clamping arms for holding a workpiece,
  a non-metallic cylindrical sleeve split along the longitudinal axis and supported one-half from each clamp piece and between said clamping arms so as to surround said workpiece when said clamp is in the clamping position,
  means for sealing the ends of said cylindrical sleeve to form an enclosure surrounding the workpiece to be joined,
  an input in said sleeve for the introduction of a non-oxidizing atmosphere surrounding the workpieces,
  a coiled induction heating conductor split into two pieces along the longitudinal axis with one piece supported in each clamp piece such that when the clamp is positioned around the workpieces, the pieces adjoin to form a coiled single conductor,
  said conductor being hollow to form a continuous cooling fluid passageway through said conductor with means to introduce said cooling fluid into said conductor, and locking means on said clamp for maintaining the clamp in holding position during the brazing operation.

References Cited in the file of this patent

UNITED STATES PATENTS

| | | |
|---|---|---|
| 1,777,233 | Sieper | Sept. 30, 1930 |
| 1,894,835 | Smith et al. | Jan. 17, 1933 |
| 2,139,499 | Howie | Dec. 6, 1938 |
| 2,649,527 | Chapman et al. | Aug. 18, 1953 |
| 2,676,242 | Witsenburg | Apr. 20, 1954 |
| 2,721,248 | Kirkpatrick | Oct. 18, 1955 |
| 2,767,290 | Chapman et al. | Oct. 16, 1956 |
| 2,901,583 | Klooz | Aug. 25, 1959 |
| 2,919,335 | Shaughnessy | Dec. 29, 1959 |
| 3,031,554 | Jackson | Apr. 24, 1962 |